UNITED STATES PATENT OFFICE.

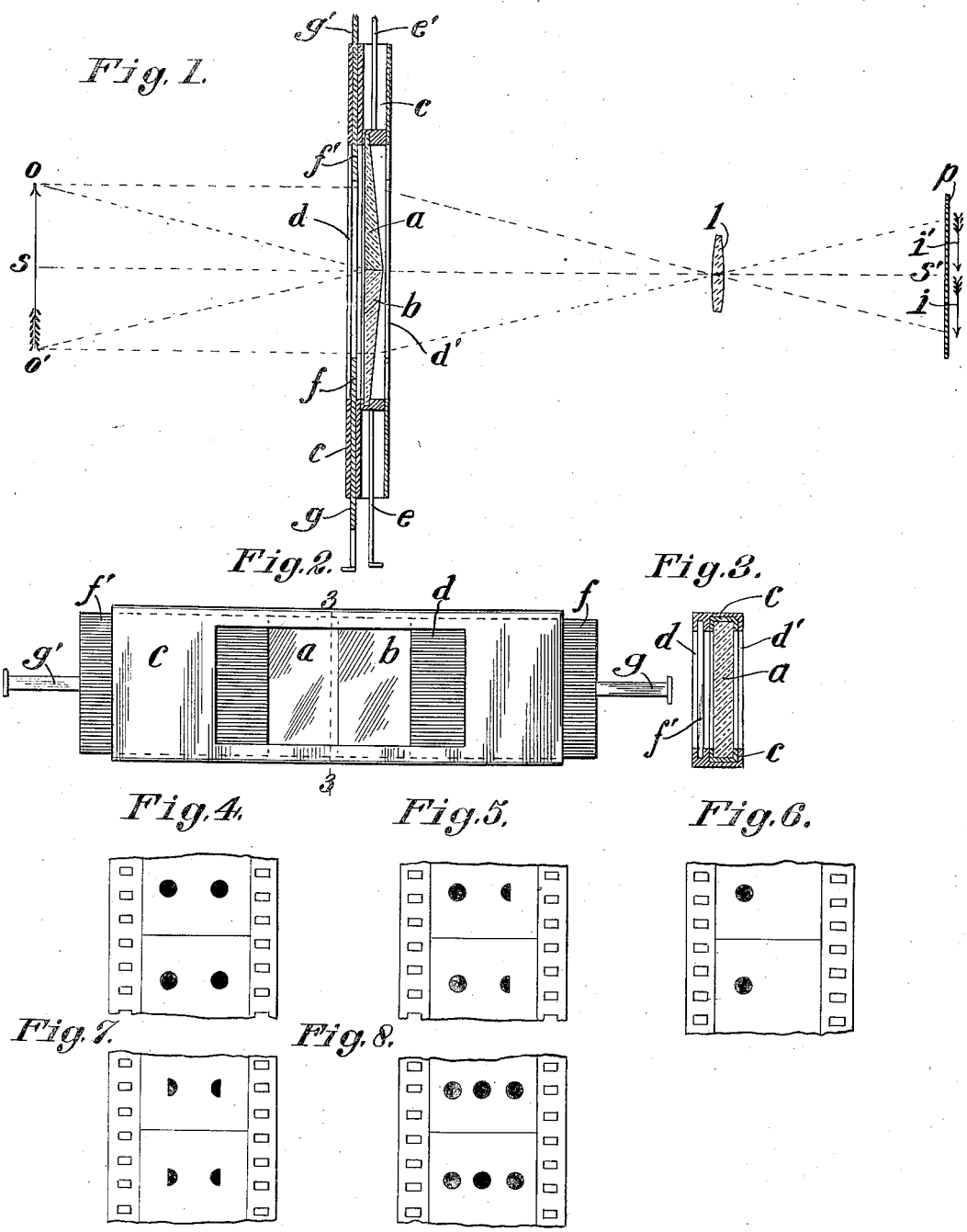

LEON F. DOUGLASS, OF SAN RAFAEL, CALIFORNIA.

DEVICE FOR PRODUCING MULTIPLE-IMAGE EFFECTS.

1,410,557.　　　Specification of Letters Patent.　　Patented Mar. 28, 1922.

Application filed December 6, 1920. Serial No. 428,797.

*To all whom it may concern:*

Be it known that I, LEON F. DOUGLASS, a citizen of the United States, residing at San Rafael, in the county of Marin and State of California, have invented new and useful Improvements in Devices for Producing Multiple-Image Effects, of which the following is a specification.

This invention relates to means for producing one or a plurality of images on cinematographic films whereby the subject may appear once, twice or threefold, or whereby double or triple exposures may be made.

The object of the invention is to afford a simple, effective and convenient means for obtaining single, double or threefold effects in photographs, as well as providing for single or multi-exposures on the same film. More particularly, an object is to produce on a cinematographic film a photograph or a series of photographs in each one of which by means of a single exposure the subject appears once, twice or thrice, as desired, as if it were one, two or three individuals, respectively, identical in every respect and occupying desired portions of the film with respect to its latitude. Another object is to produce a photograph or a series of photographs in which by successive exposure and proper masking the subject can be made to appear doubled or tripled in different poses, or two or three different subjects may be made to appear on the same cinematographic film.

In the accompanying drawings illustrating an embodiment of the present invention, Figure 1 shows the image manifolding member in horizontal section, and diagrammatically, its position with respect to the subject, the lens and the film or plate.

Figure 2 is a front elevation of the image manifolding member, which is shown in Figure 3 in vertical section taken along the line 3 3, Figure 2. Figures 4, 5, 6, 7 and 8 may be considered to show portions of motion picture films in plan view, of which Figures 5, 6 and 7 show diagrammatically the appearance of the images on the film when the shutters of the image manifolding member are respectively, completely open, one quarter shut from one side, one-half shut from one side, and one quarter shut from each side, while Figure 8 shows diagrammatically the position of the images when the shutters of the image manifolding member are completely open and the prisms of the same are separated each one third of their width from the center line of the device.

Similar reference letters refer to similar parts throughout the several views.

The present invention will be described in detail in its application to motion picture photography, and its application to other forms of photography will be obvious.

In the form shown in Figures 1, 2 and 3, $a$ and $b$ are two small-angled light-refracting prisms, the smallest lateral faces of which are shown mutually engaged. The edges of the prisms formed by the intersection of the larger lateral faces, or the apices of the prisms, are oppositely disposed so that corresponding faces of said prisms are oppositely inclined to the axis of the device, which is the axis of the lens to be referred to. The angles formed by the intersection of the larger lateral faces are between 10 and 15 degrees, preferably 12 degrees. These small angles need not be accurately the same as the prisms will functionate well at any small angle, preferably between 10 and 15 degrees. Another of the angles of each prism, that formed by the intersection of the smallest lateral face with the next larger, is preferably a right angle. While this right angle is not absolutely essential, a right angle makes conveniently possible the placing of the prisms so that the planes of their small faces may be mutually engaged while the next larger faces of the two prisms will lie in the same plane normal to the dividing plane between the two prisms when mutually engaged as described. The prisms $a$ and $b$ are placed as described in a mount $c$ provided with a front light-transmitting aperture or port $d$ and a rear light-transmitting aperture or port $d'$. The apices of the prisms $a$ and $b$ are supplied with means, respectively $e$ and $e'$, for separately adjusting one or both of the prisms by sliding the same to separate them or bring them together at will, along a plane at right angles to the axis of the device. The front and rear ports, $d$ and $d'$, are of approximately the same size as the total front presented by the two prisms, and the front port $d$ is provided with two adjustable shutters $f$ and $f'$, separately operated respectively by means of the handles $g$ and $g'$, to reciprocate toward and from each other in a plane at right angles to the axis of the device and either or both mask at will, desired portions of the port $d$ to variable extents. In Figure 2, the shutters $f$ and $f'$ are shown masking the first and last quarter of the port $d$, restricting the size of the port to the central half, and thereby masking the outer lying half of each of the prisms $a$ and $b$, which are shown with their smallest lateral faces mutually engaged, each shutter $f$ and $f'$ having been moved oppositely the same amount from the position where total closure exists.

In Figure 1, 1 represents the lens of a camera in horizontal section along its diameter, and $p$ represents a horizontal section of a photographic film at the focus of the lens 1. The arrow $o\ o'$ represents the subject photographed and $s\ s'$ is the axis of the lens or the line of vision of the camera. The other broken lines extending from the object through the prisms and the lens to the film $p$ represent the course of the light rays passing from the subject through each of the prisms and through the lens to form two images $i$ and $i'$ of the subject $o\ o'$ on the film $p$.

If the prisms are placed as shown in Figure 1, and the shutters $f$ and $f'$ are wide open, two equal and identical laterally displaced images $i$ and $i'$ of the subject $o\ o'$ are formed on the film $p$. If, for example, the subject were a black circle, the images on the film $p$ will appear as shown in Figure 4. If the shutter $f'$ is moved so that it masks one half of the portion of the port $d$ located before the prism $b$, only one half of image $i'$ will be recorded on $p$ with all of image $i$ as shown in Figure 5. If the shutter $f'$ entirely masks the portion of the port $d$ located before the prism $b$, only image $i$ will be recorded as is shown in Figure 6. If both shutters $f$ and $f'$ are placed approximately as shown in Figure 2, that is when both prisms $a$ and $b$ are masked off so as to leave exposed only the adjacently lying halves of each, the opposite halves of images $i$ and $i'$ only will be recorded as shown in Fig. 7.

If the port $d$ is now opened to the fullest extent, and the two prisms $a$ and $b$ are separated from each other equally with respect to the line $s\ s'$, Figure 1, and an amount equal to one third the width of the port $d$, a separate pencil of light rays from the subject $o\ o'$ will pass unobstructed through the space between the prisms through the lens 1 to form a third image identical with and centrally located with respect to the laterally displaced images $i$ and $i'$ formed by the portions of the prisms $a$ and $b$ still effective, as shown in Figure 8. By adjusting the prisms $a$ and $b$ until they are entirely masked by the mount $c$, or by the shutters $f$, $f'$, only a single image will be formed on the film $p$. Many other manipulations of this image manifolding device will be apparent to bring about novel effects desirable in motion picture production.

For multiple exposures, obviously, the parts of the film masked off by means of the shutters will be unexposed, wherefore the films may be run through the camera a second or third time for subsequent exposure of the previously masked off portions, with change of subject or simply a change of pose.

It will therefore be seen that I have provided a simple, effective and convenient means for producing one or a plurality of images on a cinematographic film so as to produce novel image manifolding and multi-exposure effects. By separately or conjointly adjusting the prisms to interpose either, neither or both in different positions in the path of the light rays passing through the lens, a number of different effects may be obtained whereby one, two or three images may be formed in desired portions of the film with respect to its latitude. Moreover, the separately adjustable shutters may be variously positioned so as to cut off all or variable amounts of the light rays from each or both of said prisms so that either, neither or both of said prisms may be entirely or partly masked at will. Additionally, the independent adjustment of the shutters enables the latter to vary the admission of light to said prisms in any of the several positions to which the prisms may be separately adjusted. Therefore, a relatively large number of simultaneous or subsequent exposure effects can be obtained by suitable adjustment of the prisms and shutters, a few of which have been indicated above, while many others will now be apparent to those skilled in the art.

While the embodiment of the invention illustrated on the drawing has been described with considerable particularity, it is to be expressly understood that the invention is not limited thereto, as the same is capable of receiving a variety of mechanical expressions, some of which will now readily suggest themselves to those skilled in the art, while changes may be made in the details of construction, arrangement and proportion of parts, in the means for effecting the respective adjustment of the prisms and shutters, etc. without departing from the spirit of this invention. Reference is therefore to be had to the appended claims for a definition of the limits of the invention.

I claim:

1. Means for producing a plurality of laterally displaced images on a cinematographic film comprising, in combination with a lens, a pair of small-angle refracting prisms having faces oppositely inclined to the axis of the lens, and means mounting said prisms whereby either or both of said prisms may be adjusted toward and from the other.

2. Means for producing a plurality of laterally displaced images on a cinematographic film comprising, in combination with a lens, a pair of small-angle refracting prisms having faces oppositely inclined to the axis of the lens, means mounting said prisms whereby either or both of said prisms may be adjusted toward and from the other, and means for masking either or both of said prisms to variable extents.

3. Means for producing a plurality of laterally displaced images on a cinematographic film comprising, in combination with a lens, a pair of separate laterally adjustable small-angle refracting prisms having faces oppositely inclined to the axis of the lens, a shutter for each of said prisms, and means mounting said shutters whereby either of both of said shutters may be adjusted toward and from the other.

4. Means for producing a plurality of laterally displaced images on a cinematographic film comprising, in combination with a lens, two light-refracting prisms having oppositely-disposed substantially-equal angles of small magnitude, and means for reciprocating said prisms so that their least lateral sides may be engaged or separated.

5. Means for producing a plurality of laterally displaced images on a cinematographic film comprising, in combination with a lens, two light-refracting prisms having oppositely-disposed substantially-equal angles of small magnitude, means mounting said prisms for relative transverse adjustment and having a light transmitting aperture, and means coacting with said aperture for separately masking either or both of said prisms to variable extents.

6. In combination with a lens and a cinematographic film, a pair of small-angle refracting prisms having faces oppositely inclined with respect to the axis of said lens whereby two laterally displaced images may be formed on said film, and means mounting said prisms whereby they may be adjusted to produce one or three images on said film.

7. In combination with a lens and a cinematographic film, a pair of small-angle refracting prisms having faces oppositely inclined with respect to the axis of said lens whereby two laterally displaced images may be formed on said film, means mounting said prisms whereby they may be adjusted to produce on or three images on said film, and means to mask either or both of said prisms in their different operative positions.

8. In combination with a lens and a cinematographic film, a pair of small-angle refracting prisms, and means mounting said prisms whereby the same may be adjusted to interpose either, neither or both in the path of the light rays passing through said lens.

9. In combination with a lens and a cinematographic film, a pair of small angle refracting prisms interposed in the path of the light rays passing through said lens, and means mounting said prisms whereby either or both of said prisms may be moved to different positions in the path of said rays.

10. In combination with a lens and a cinematographic film, a pair of small-angle refracting prisms interposed in the path of the light rays passing through said lens, means mounting said prisms whereby either or both of said prisms may be moved in a plane at right angles to the axis of said lens, a shutter for each of said prisms, and means mounting said shutters whereby either or both of said shutters may be moved in a plane at right angles to said axis.

In testimony whereof I have affixed my signature hereto.

LEON F. DOUGLASS.